US008689297B2

(12) United States Patent
Pasquero et al.

(10) Patent No.: US 8,689,297 B2
(45) Date of Patent: Apr. 1, 2014

(54) SYSTEM, DEVICES AND METHOD FOR SECURE AUTHENTICATION

(75) Inventors: Jerome Pasquero, Kitchener (CA); David Ryan Walker, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 491 days.

(21) Appl. No.: 12/949,890

(22) Filed: Nov. 19, 2010

(65) Prior Publication Data

US 2012/0131653 A1 May 24, 2012

(51) Int. Cl.
G06F 21/00 (2013.01)
(52) U.S. Cl.
USPC .............................................. 726/6
(58) Field of Classification Search
USPC ................................ 726/2–7, 9, 27
See application file for complete search history.

(56) References Cited

U.S. PATENT DOCUMENTS

| 6,993,658 | B1 * | 1/2006 | Engberg et al. | 713/185 |
|---|---|---|---|---|
| 8,044,947 | B2 * | 10/2011 | Muller et al. | 345/207 |
| 8,225,383 | B1 * | 7/2012 | Channakeshava et al. | 726/7 |
| 2002/0169988 | A1 | 11/2002 | Vandergeest et al. | |
| 2004/0128389 | A1 * | 7/2004 | Kopchik | 709/228 |
| 2008/0098464 | A1 * | 4/2008 | Mizrah | 726/5 |
| 2009/0241175 | A1 * | 9/2009 | Trandal et al. | 726/7 |

FOREIGN PATENT DOCUMENTS

| CA | 2758770 | 5/2012 |
|---|---|---|
| EP | 2456245 | 5/2012 |
| KR | 10-2004-0074291 | * 3/2006 |
| KR | 10-2006-0050631 | * 10/2007 |
| WO | WO03/065676 | * 8/2003 |

OTHER PUBLICATIONS

Clipperz website http://www.clipperz.com/security_privacy—Available at: http://replay.waybackmachine.org/20091115091209/http://www.clipperz.com/.
Passpack Blog Page, http://blog.passpack.com/ © 2006-2011.
Just1Key Home Page, http://www.just1key.com/—Available at: http://replay.waybackmachine.org/20090627205857/http://wvww.just1key.com/.
Agatra Login Page, https://www.agatra.com/—Available at: http://replay.waybackmachine.org/20070622181449/http://www.agatra.com/index.php?
Passpack "Free Online Password manager" http://www.passpack.com © 2006-2011—Available at: http://replay.waybackmachine.org/20100830161415/http://www.passpack.com/en/home/.
Rohos "Login Key Video", Nov. 28, 2008 http://www.rohos.com/2008/11/rohos-logon-key-video-how-to-use—© 2005-2010. Tesline-Service.S.R.L.
Rohos "Touchtag—wirelss tag for Windows and Mac logon", Mar. 24, 2009 http://www.rohos.com/2009/03/touchatag-contactless-tag-to-access-the-windows/ © 2005-2010.

(Continued)

*Primary Examiner* — Lisa Lewis
(74) *Attorney, Agent, or Firm* — Bereskin & Parr LLP/S.E.N.C.R.L.,s.r.l.

(57) ABSTRACT

A system, devices and method for authenticating a user requesting access, through a computing device connected to a network, to an on-line resource hosted by a server in communication with the network. The system, devices and method employing an authentication server and a mobile communications device in communication over a wireless network. The authentication server forwarding an authentication to the mobile communications device. Optionally, the authentication server also returning security information related to the authentication in response to the request. The mobile communications device operative to receive and process the authentication, and forward the processed authentication to the computing device over a short-range communications link.

18 Claims, 11 Drawing Sheets

(56) References Cited

OTHER PUBLICATIONS

McGrath et al. "Which Browser Warning Notification?", 2006, Harvard University, Cambridge. Available at: http://www.eecs.harvard.edu/~prash/papers/cs279r/cs279r-paper.pdf.

McGrath et al. "Which Browser Warning Notification?", 2006, Harvard University, Cambridge. Available at: http://www.eecs.harvard.edu/~prash/papers/cs279r/cs279r-appendix.pdf.

McGrath et al. "Browser Warning Notification", 2006, Harvard University, Cambridge. Available at: http://www.eecs.harvard.edu/~prash/papers/cs279r/cs279r-slides.ppt.

"Handypassword home Jan. 2008.pdf" Password Manager—Available at: http://web.archive.org/web/*/http://handypassword.com; eg Jan. 10, 2008.

"Handypassword version history Jan. 2008.pdf" Password Manager Available at: http://web.archive.org/web/*/http://handypassword.com; eg Jan. 10, 2008—version history.

Microsoft TechNet Internet Explorer 6 (eg appendix—app IE6.pdf) Available at: http://technet.microsoft.com/en-us/library/dd361873.aspx.

McGrath et al. "Which Browser Warning Notification?", 2006, Harvard University, Cambridge. Available at: http://www.eecs.harvard.edu/~prash/papers/cs279r/cs279r-appendix2.pdf.

McGrath et al. "Which Browser Warning Notification?", 2006, Harvard University, Cambridge. Available at: http://www.eecs.harvard.edu/~prash/papers/cs279r/cs279r-appendix3.pdf.

Extended European Search Report. European Application No. 10191854.8. Dated: Apr. 12, 2011.

Response. European Application No. 10191854.8. Dated: Jul. 11, 2011.

Communication under Rule 71(3) EPC. European Application No. 10191854.8. Dated: Apr. 3, 2013.

Decision to grant a European patent pursuant to Article 97(1) EPC. European Patent Application No. 10191854.8. Dated: Aug. 16, 2013.

Office Action. Canadian Patent Application No. 2,758,770. Dated: Nov. 15, 2013.

\* cited by examiner

SYSTEM, DEVICES AND METHOD FOR SECURE AUTHENTICATION

FIELD OF THE INVENTION

This invention relates to a system and computer-implemented method for authenticating a user. In particular, this invention relates to remote authentication of a user.

BACKGROUND OF THE INVENTION

A user accessing an on-line resource is typically required to authenticate their identity by entering log-in credentials, typically consisting of a user credential, such as a username, and an associated password. The on-line resource compares the credentials with its records and, if there is a match, authenticates the user to allow access to the on-line resource.

In practice, this requires the user to either remember different sets of credentials, one set associated with each on-line resource, re-use log-in credentials for multiple on-line resources or record the credentials and associated on-line resource identifying information in a safe location.

Current methods of improving this process typically relate to a web browser of a computing device remembering a history of the user and auto-populating the authentication fields when prompted by an on-line resource. This approach suffers from a lack of security in that the computing device, which is accessible on a network, is storing the authentication where it could be accessed by an attacker if the security of the computing device were breached.

Another disadvantage of this approach is that a user still has to remember their credentials when using a different computing device that lacks the history, or if the history of the device has been cleared. This may require retrieving information from each on-line resource via an email account, or some other means where a user has forgotten their credentials. Since the browser is auto-populating the log-in fields, it is more likely that a user will forget their credentials.

Another disadvantage of this method is that it encourages users to maintain a static set of credentials and to use simple user credentials and associated passwords to assist their memory.

There is a need for a system, devices and method for avoiding limitations in the prior art.

BRIEF DESCRIPTION OF THE DRAWINGS

In drawings which illustrate by way of example only a preferred embodiment of the invention.

DETAILED DESCRIPTION OF THE INVENTION

Figure 1:
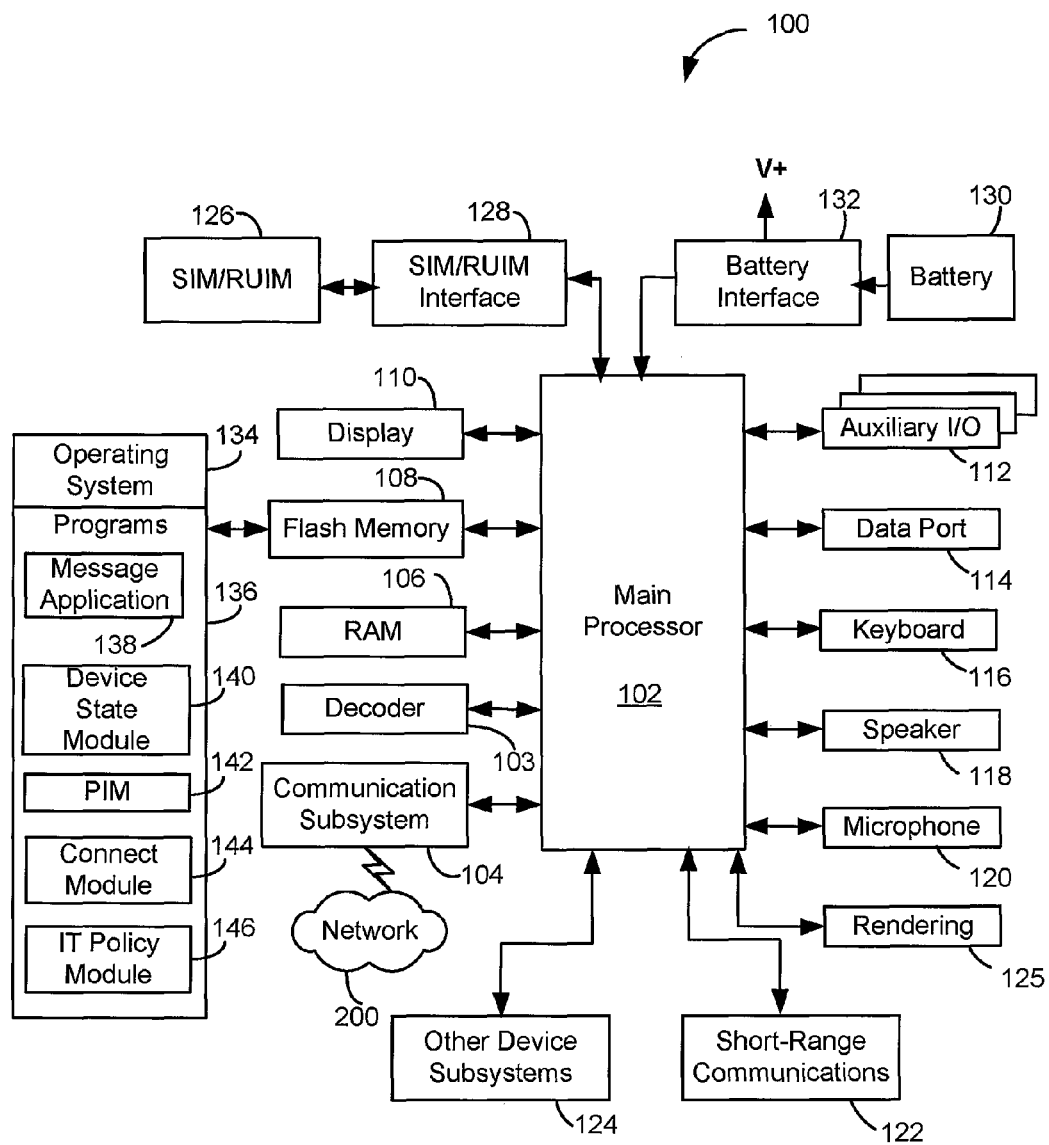
FIG. 1 is a block diagram of an embodiment of a mobile communication device.

A system, devices and method are providing for secure authentication of a user accessing an on-line resource hosted by a server.

In an embodiment a system is provided for authenticating a user requesting access, through a computing device connected to a network, to an on-line resource hosted by a server in communication with the network. In an embodiment, the system may comprise: a mobile communication device connected to a wireless network, the mobile communications device further operative to communicate over a short-range communications link; an authentication server connected to the network and in communication with the mobile communications device over the wireless network; wherein the authentication server is operative to receive an on-line resource access request through the network, process the request and, if the request is verified, forward an authentication to the mobile communications device using the wireless network and return decryption security information related to the authentication over the network in response to the request; and, wherein the mobile communications device is connected to the wireless network and is operative to receive the authentication over the wireless network, process the authentication and forward the processed authentication to the computing device over the short-range communications link.

In an aspect, the system may further comprise the computing device, the computing device operative to receive the on-line resource access request from the user and to forward the request to the authentication server and operative to communicate over the short-range communications link and to receive the processed authentication over the short-range communications link from the mobile communications device for submission to the server over the network.

In an aspect of the system, the computing device may be further operative to receive the decryption security information over the network and to process the processed authentication using the decryption security information to obtain on-line resource log-in credentials and forward the on-line resource log-in credentials to the server to access the on-line resource.

In an aspect, the system may further comprise the server connected to the network and operative to host the on-line resource; the server further operative to receive an on-line resource access request from a computing device through the network, process the request and forward the request to an authentication server; the server further operative to receive the decryption security information from the authentication server and the processed authentication from the computing device; the server further operative to process the processed authentication using the decryption security information to authenticate the request.

In an embodiment, a mobile communications device is provided. The mobile communications device may comprise a communications subsystem for communicating over a wireless network; a short-range communications subsystem for short-range communications; a processor, in communication with the communications subsystem and the short-range communications subsystem, the processor operative to enable the device to receive an authentication through the communications subsystem, process the authentication and forward the processed authentication to a computing device through the short-range communications subsystem.

In an aspect, of the mobile communications device, the authentication may include instructions for execution by the device, the processor further operative to process and execute the instructions to process the authentication. The device may further comprise: a secure memory store in communication with the processor, wherein the instructions comprise encryption security information and the authentication comprises information to identify on-line resource log-in credentials stored in the secure memory store; and, the processor is further operative to process the information to locate the identified credentials and secure the identified credentials using the encryption security information to create the processed authentication.

In an aspect of the device, the processor may be further operative to decrypt the identified credentials from a first encryption state when stored in the secure memory state and to encrypt the decrypted identified credentials using the encryption security information into a second encrypted state.

In an aspect the device may further comprise: a user input interface; and, the processor operative to execute the instructions to request and require user input through the user input interface, before the device forwards the processed authentication. The processor may be further operative to receive the user input through the user input interface, compare the user input with a pre-defined user input stored on the device and forward the processed authentication if the user input matches the pre-defined user input.

In an embodiment, an authentication server may be provided, the authentication server comprising: a communication subsystem in communication with a network and a wireless network; a data store; a processor, in communication with the communication subsystem and the data store, the processor operative to enable the authentication server to receive an on-line resource access request from a computing device through the network, compare the request with information maintained within the data store to identify log-in credentials corresponding to the request and generate an authentication and decryption security information related to the authentication; and, the processor further operative to enable the authentication server to forward the authentication to a mobile communications device in communication with the wireless network and to forward the decryption security information in response to the request over the network.

In an aspect, the authentication server may further comprise: the processor operative to encrypt the credentials to generate the authentication, such that the authentication may be decrypted using the decryption security information. The processor may be further operative to generate an identifier that identifies the credentials, and to generate encryption security information related to the decryption security information, to generate the authentication; whereby the encryption security information may be used by the mobile communications device to encrypt the credentials identified by the identifier, such that the encrypted identified credentials may be decrypted using the decryption security information.

In an embodiment, a server connected to a network and operative to host an on-line resource may be provided, the server comprising a processor operative to enable the server to: receive an on-line resource access request from a computing device through the network; process the request; forward the request to an authentication server; receive decryption security information from the authentication server; receive a processed authentication from the computing device; and, process the processed authentication using the decryption security information to authenticate the request.

In an embodiment, a computing device may be provided, the computing device comprising: a user input interface for receiving input from a user; a network communication subsystem for communicating with a network; a short-range communication subsystem for short-range communications with other computing devices; and, a processor in operative communication with the user input interface, the network communication subsystem and the short-range communication subsystem, the processor operative to enable the computing device to: receive a request to access an on-line resource available on the network through the user input interface; forward the request to an authentication server on the network; receive a processed authentication from a mobile communications device through the short-range communication subsystem; and, forward the processed authentication to the on-line resource for authentication to access the on-line resource.

In an aspect of the computing device, the processor may be further operative to: receive decryption security information through the network in response to the forwarded request; process the processed authentication using the decryption security information to obtain on-line resource log-in credentials; and, forward the on-line resource log-in credentials to the on-line resource in place of the processed authentication to authenticate the user and gain access to the on-line resource.

In an embodiment, a method may be provided for authenticating a user requesting access, through a computing device connected to a network, to an on-line resource hosted on a server accessible via the network, the method comprising the computing device receiving a request for on-line content from the user; the computing device forwarding the request to an authentication server connected to the network, the computing device receiving a processed authentication over a short-range communications subsystem and, the computing device forwarding the processed authentication to the server over the network to authenticate the user.

In an aspect, the method of may further comprise: the computing device receiving decryption security information over the network; and, the computing device processing the processed authentication using the decryption security information to obtain log-in credentials; the computing device forwarding credentials to the server in place of the processed authentication to authenticate the user.

In an aspect, the method of may further comprise: the server receiving decryption security information from the authentication server; the server processing the processed authentication using the decryption security information to authenticate the user.

In an aspect, the method of may further comprise: the authentication server receiving the request; the authentication server comparing the request with stored information to identify log-in credentials; the authentication server forwarding an authentication to a mobile device over a wireless network and decryption security information over the network in response to the request. The authentication server may forward the decryption security information to the computing device for decrypting encrypted log-in credentials identified by the request.

In an aspect, the method of may further comprise: a mobile communications device receiving an authentication from the authentication server over a wireless network; the mobile device processing the authentication; the mobile device forwarding the processed authentication over a short-range communications subsystem of the mobile device to the computing device. The authentication processing may comprise executing instructions contained in the authentication before forwarding the processed authentication. The instructions may comprise an identifier and encryption security information and the executing may comprise the mobile device identifying credentials stored on the device and encrypting the identified credentials to create the processed authentication. The instructions may comprise a requirement to obtain a specified user input and the executing may comprise the mobile device notifying the user of a specified request for user input and forwarding the processed authentication to the computing device if the requested input is received.

The embodiments herein of computing devices are described as including a processor. It is understood, that such reference refers to at least one processor and includes multi-core processors or multiple processors.

FIG. 1 is a block diagram of an exemplary embodiment of a mobile communication device 100. The mobile communication device 100 includes a number of components such as a main processor 102 that controls the overall operation of the mobile communication device 100. Communication functions, including data and voice communications, are performed through a communication subsystem 104. Data received by the mobile communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the mobile communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the mobile communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE and UMTS. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range wireless communications 122 and other device subsystems 124.

Some of the subsystems of the mobile communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering circuit 125 may be implemented as hardware, software, or as a combination of both hardware and software.

The mobile communication device 100 can send and receive communication signals over the wireless network 200 after required network registration or activation procedures have been completed. Network access is associated with a subscriber or user of the mobile communication device 100. To identify a subscriber, the mobile communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the mobile communication device 100 and to personalize the mobile communication device 100, among other things. Without the SIM/RUIM card 126, the mobile communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The mobile communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile communication device 100. Although current technology makes use of a battery, future technologies such as micro fuel cells can provide the power to the mobile communication device 100.

The mobile communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the mobile communication device 100 during its manufacture. Other software applications include a message application 138 that can be any suitable software program that allows a user of the mobile communication device 100 to send and receive electronic messages. Various alternatives exist for the message application 138 as is well known to those skilled in the art. Messages that have been sent or received by the user are typically stored in the flash memory 108 of the mobile communication device 100 or some other suitable storage element in the mobile communication device 100. In at least some embodiments, some of the sent and received messages can be stored remotely from the device 100 such as in a data store of an associated host system that the mobile communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the mobile communication device 100 with respect to such items. This can be particularly advantageous when the host computer system is the mobile device subscriber's office computer system.

The mobile communication device 100 also includes a connect module 144, and an information technology (IT) policy module 146. The connect module 144 implements the communication protocols that are required for the mobile communication device 100 to communicate with the wireless infrastructure and any host system, such as an enterprise system, that the mobile communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the mobile communication device 100 to allow the mobile communication device 100 to use any number of services associated with the enterprise system. The connect module 144 allows the mobile communication device 100 to establish an end-to-end secure, authenticated communication pipe with the host system. A subset of applications for which access is provided by the connect module 144 can be used to pass IT policy commands from the host system to the mobile communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the mobile communication device 100. These software applications can be third party applications, which are added after the manufacture of the mobile communication device 100. Examples of third party applications include games, calculators, utilities, etc.

The additional applications can be loaded onto the mobile communication device 100 through at least one of the wireless network 200, the auxiliary I/O subsystem 112, the data port 114, the short-range wireless communications subsystem 122, or any other suitable device subsystem 124. This flexibility in application installation increases the functionality of the mobile communication device 100 and can provide enhanced on-device functions, communication-related functions, or both. For example, secure communication applications can enable electronic commerce functions and other such financial transactions to be performed using the mobile communication device 100.

The data port 114 enables a subscriber to set preferences through an external device or software application and extends the capabilities of the mobile communication device 100 by providing for information or software downloads to the mobile communication device 100 other than through a wireless communication network. The alternate download path can, for example, be used to load an encryption key onto the mobile communication device 100 through a direct and thus reliable and trusted connection to provide secure device communication. The data port 114 can be any suitable port that enables data communication between the mobile communication device 100 and another computing device. The data port 114 can be a serial or a parallel port. In some instances, the data port 114 can be a USB port that includes data lines for data transfer and a supply line that can provide a charging current to charge the battery 130 of the mobile communication device 100.

The short-range wireless communications subsystem 122 provides for communication between the mobile communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the mobile communication device 100 is substantially similar, except that the received signals are output to the speaker 118, and signals for transmission are generated by the microphone 120. Alternative voice or audio I/O subsystems, such as a voice message recording subsystem, can also be implemented on the mobile communication device 100. Although voice or audio signal output is accomplished primarily through the speaker 118, the display 110 can also be used to provide additional information such as the identity of a calling party, duration of a voice call, or other voice call related information.

In an aspect, a computing device program product may be provided for execution on the computing device 100, the computing device program product rendering the computing device 100 operative to carry out steps of the method. In an embodiment, the computing device program product may comprise computer readable program code means embodied on a storage medium such as an optical disc, hard disc or other non-transitory memory.

Figure 2:
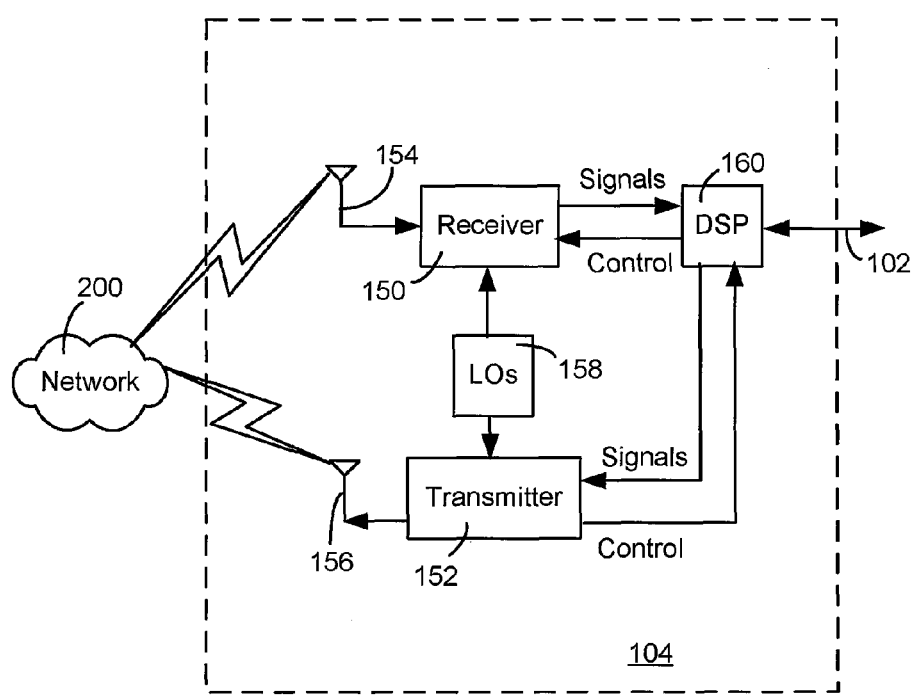
FIG. 2 shows an exemplary block diagram of a communication subsystem component of an embodiment of a mobile communication device.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the mobile communication device 100 and the wireless network 200 can contain one or more different channels, typically different RF channels, and associated protocols used between the mobile communication device 100 and the wireless network 200. An RF channel is a limited resource that should be conserved, typically due to limits in overall bandwidth and limited battery power of the mobile communication device 100. When the mobile communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
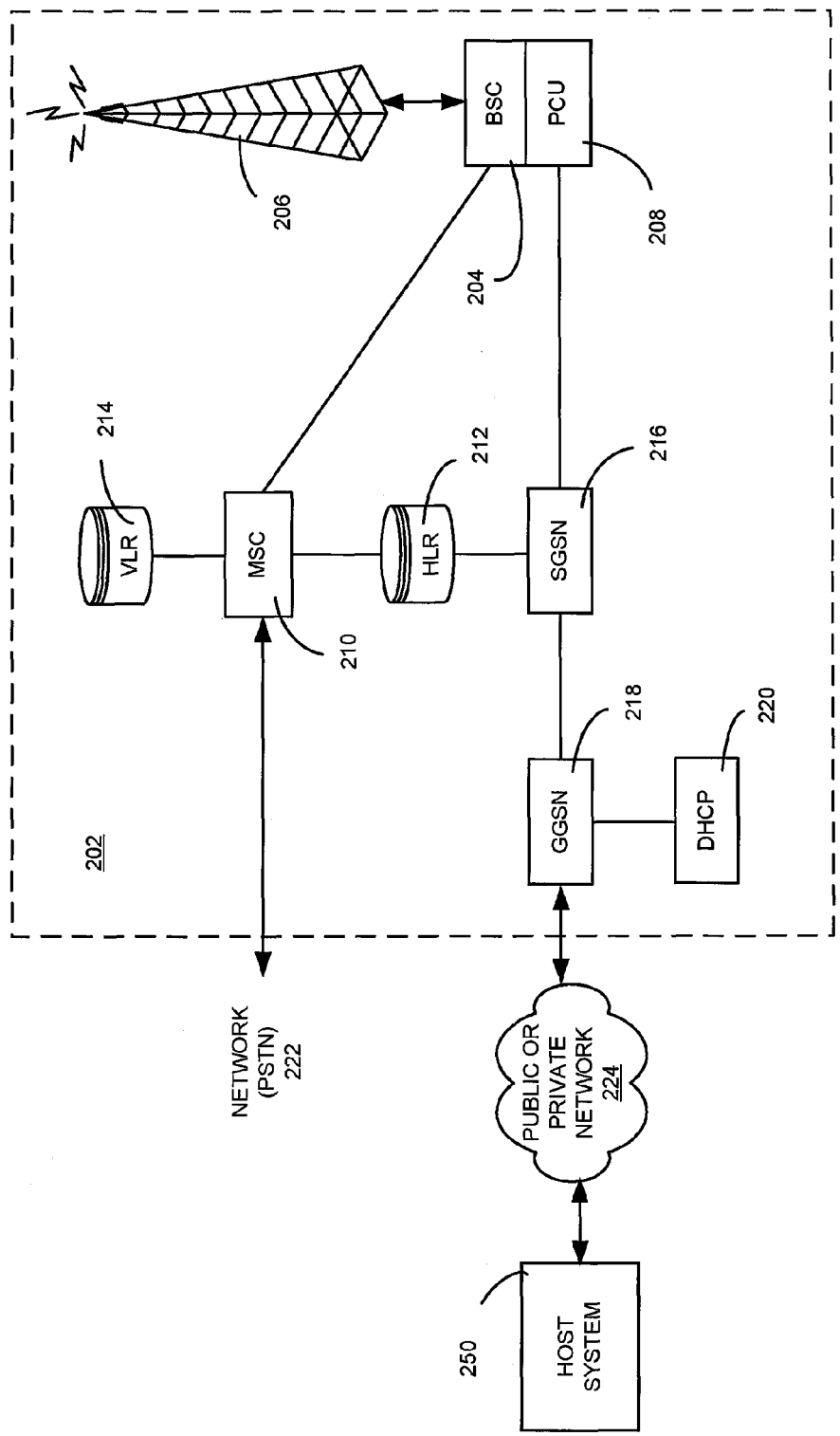
FIG. 3 is a block diagram of an exemplary implementation of a node of a wireless network.

FIG. 3 is a block diagram of an exemplary implementation of a node 202 of the wireless network 200. In practice, the wireless network 200 comprises one or more nodes 202. In conjunction with the connect module 144, the mobile communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile communication device 100 in accordance with particular, usually predetermined, communication protocols and parameters, under control of its controller. The fixed transceiver equipment similarly demodulates and possibly decodes and decrypts, if necessary, any communication signals received from the mobile communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given mobile communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile communication device 100 is not using its PDP Context, the PDP Context can be de-allocated and the IP address returned to the IP address pool managed by the DHCP server 220.

Figure 4:
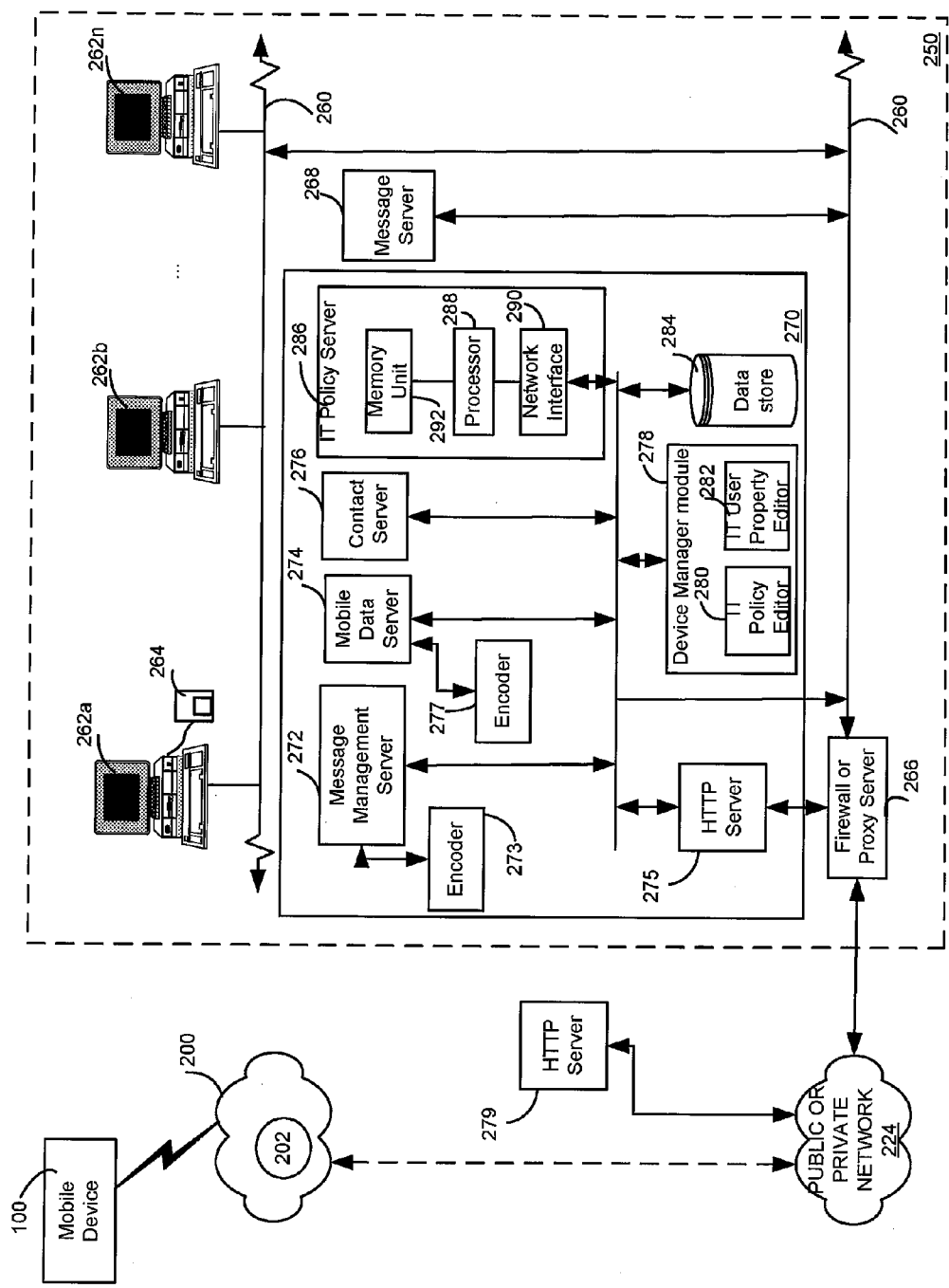
FIG. 4 is a block diagram illustrating components of an exemplary configuration of a host system.

FIG. 4 is a block diagram illustrating components of an exemplary configuration of a host system 250 with which the mobile communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the mobile communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's mobile communication device 100 is situated on a LAN connection. The cradle 264 for the mobile communication device 100 can be coupled to the computer 262a by a serial or a Universal Serial Bus (USB) connection, for example. Other user computers 262b-262n are also situated on the network 260, and each can be equipped with an accompanying cradle 264. The cradle 264 facilitates the loading of information (e.g. PIM data, private symmetric encryption keys to facilitate secure communications) from the user computer 262a to the mobile communication device 100, and can be particularly useful for bulk information updates often performed in initializing the mobile communication device 100 for use. The information downloaded to the mobile communication device 100 can include certificates used in the exchange of messages.

It will be understood by persons skilled in the art that the user computers 262a-262n are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the mobile communication device 100 and the wireless communication of messages and message-related data between the mobile communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the mobile communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile communication device 100. The wireless VPN router allows a VPN connection to be established directly through a specific wireless network to the mobile communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile communication device 100 in this alternative implementation.

Messages intended for a user of the mobile communication device 100 are initially received by a message server 268 of the host system 250. Such messages can originate from any number of sources. For instance, a message can have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262a can request the e-mail messages associated with that user's account stored on the data store associated with the message server 268. These messages are then retrieved from the data store and stored locally on the computer 262a. The data store associated with the message server 268 can store copies of each message that is locally stored on the mobile communication device 100. Alternatively, the data store associated with the message server 268 can store all of the messages for the user of the mobile communication device 100 and only a smaller number of messages can be stored on the mobile communication device 100 to conserve memory. For instance, the most recent messages (i.e. those received in the past two to three months for example) can be stored on the mobile communication device 100.

When operating the mobile communication device 100, the user may wish to have e-mail messages retrieved for delivery to the mobile communication device 100. The message application 138 operating on the mobile communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the mobile communication device 100 is assigned its own e-mail address, and messages addressed specifically to the mobile communication device 100 are automatically redirected to the mobile communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile communication device 100. The message management server 272 also facilitates the handling of messages composed on the mobile communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's mobile communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the mobile communication device 100 via the shared network infrastructure 224 and the wireless network 200. The message management server 272 can also receive messages composed on the mobile communication device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile communication device 100 can be defined (e.g. by an administrator in accordance with IT policy) and enforced by the message management server 272. These may include whether the mobile communication device 100 can receive encrypted and/or signed messages, minimum encryption key sizes, whether outgoing messages must be encrypted and/or signed, and whether copies of all secure messages sent from the mobile communication device 100 are to be sent to a pre-defined copy address, for example.

The message management server 272 can also be adapted to provide other control functions, such as only pushing certain message information or pre-defined portions (e.g. "blocks") of a message stored on the message server 268 to the mobile communication device 100. For example, in some cases, when a message is initially retrieved by the mobile communication device 100 from the message server 268, the message management server 272 can push only the first part of a message to the mobile communication device 100, with the part being of a pre-defined size (e.g. 2 KB). The user can then request that more of the message be delivered in similar-sized blocks by the message management server 272 to the mobile communication device 100, possibly up to a maximum pre-defined message size. Accordingly, the message management server 272 facilitates better control over the type of data and the amount of data that is communicated to the mobile communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as an File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the mobile communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the mobile communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the mobile communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the mobile communication device 100, and the like.

Rendering data files originally optimized or prepared for visualization on large-screen displays on a portable electronic device display often requires additional processing prior to visualization on the small-screen portable electronic device displays. According to an embodiment, this additional processing is accomplished by the rendering engine 125 shown in FIG. 1. As will be appreciated by those of skill in the art, the rendering engine can be implemented in hardware, software, or a combination thereof, and can comprise a dedicated image processor and associated circuitry, or can be implemented within main processor 102.

Figure 5:
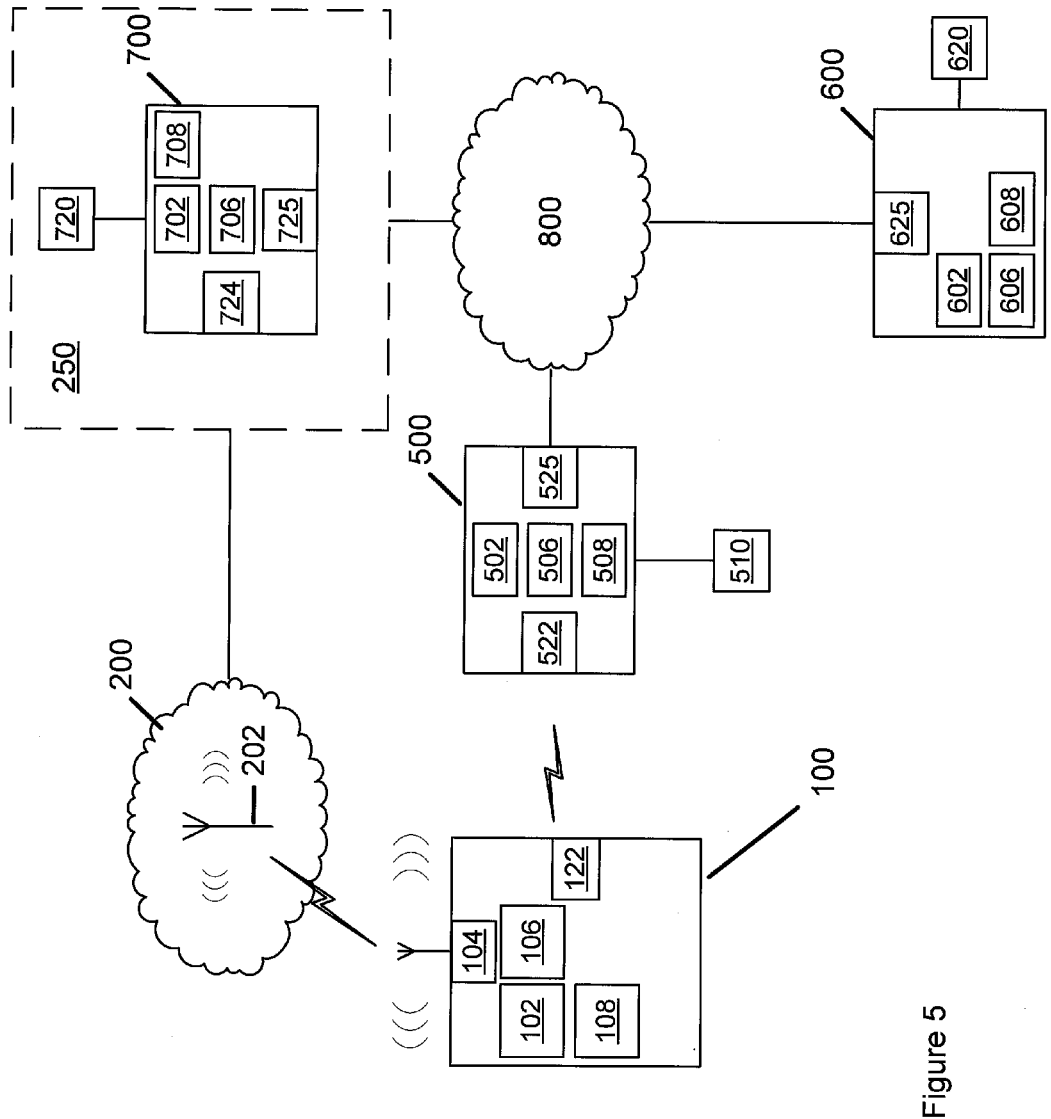
FIG. 5 is a block diagram illustrating an embodiment of a system for authenticating a user.

Referring to FIG. 5, there is an exemplary embodiment comprising a computing device 500 connected to a public or private network such as the Internet 800. Computing device 500 could be a computer which a user is utilising to navigate the Internet 800 to access an on-line resource, for instance through a web browser. In a typical embodiment, processor 502 will communicate with RAM 506 and non-transitory storage memory 508 to execute a software program product, such as a web browser, to enable computing device 500 to communicate with the Internet 800 and access a server hosting the on-line resource, such as web server 600 connected to the Internet 800 through a network communication subsystem 625.

Computing device 500 further comprises a user input interface 510 such as a keyboard, mouse or touch screen for receiving input from a user, a network communication subsystem 525 for communications between the communication device 500 and the Internet 800, and a short-range communications subsystem 522 for short-range communications with other computing devices. In an embodiment, the short-range communications subsystem 522 may comprise a wireless short-range communications means such as Bluetooth™ or Infrared. In an alternate embodiment, the short-range communications subsystem 522 may comprise a data port for physical connection to another computing device, for instance through a USB connection.

The web server 600 may receive an on-line resource request for content from the computing device 500 and, enabled by program code executing on the web server processor 602 in communication with web server RAM 606 and web server storage memory 608, will access content stored in web server storage memory 608, or a connected memory archive 620, and deliver the content to the computing device 500.

In applications where the content is an authentication portal for authenticating the user before delivering content intended for the user, or re-directing the user to another on-line resource, the first content delivered to the computing device 500 may comprise a user authentication portal. A user authentication portal may be presented as a web page that receives on-line resource log-in credentials comprising a credential input field for the user to enter an on-line resource user credential and a password input field for the user to enter an associated on-line resource user password that is associated with the user's credential. As is known, a user authentication portal may present some other input means, capable of receiving the on-line resource user credential and the associated on-line resource user password from the user. Typically a user will enter the on-line resource user credential and the associated on-line resource user password by inputting data through the user input interface 510, for instance a keyboard or touch-screen associated with the computing device 500.

According to an embodiment, an on-line authentication method may be employed wherein the computing device 500 utilises the mobile communications device 100 to assist in obtaining the user's on-line resource log-in credentials associated with a particular on-line resource. In an embodiment, the web browser operating on the computing device 500 includes program code to render the web browser operative to utilise the mobile communications device 100 for authentication. In both embodiments, authentication credentials consisting of an authentication user credential and an associated authentication user password are transmitted by the computing device 500, optionally along with an on-line resource identifier associated with the on-line resource being accessed, to an authentication server 700.

As will be appreciated, the program code could either comprise a component of the web browser, including a plug-in or extension, or the program code may comprise a separate program that receives content and requests from the web browser. For the embodiment where the web browser is so enabled, the web browser will accept authentication credentials comprising an authentication user credential and an associated authentication user password from the user.

The computing device 500 transmits the authentication credentials, comprising the authentication user credential and the associated authentication user password and optionally an on-line resource identifier, via the network communication subsystem 525 over the Internet 800 to an authentication server 700 through the authentication server communication subsystem 725. The authentication server 700 is enabled by program code executing on at least one authentication server processor 702 in communication with authentication server RAM 706 and authentication server storage memory 708. Alternatively, the authentication server 700 may comprise a server within the host system 250, or a server external to the host system 250 such as a service provider's server supplied and maintained by a service provider such as a device manufacturer, or a telecommunications company that is providing access to the wireless network 200.

For the purposes of this description, the authentication server 700 will be described as being within the host system 250, and in communication with the wireless network 200 and the Internet 800 through the network communication subsystem 725. In an embodiment, network communication subsystem 725 may provide communication with the Internet 800 and a wireless communication subsystem 724 may provide for communication with the nodes 202 of the wireless network 200, for instance over a private network. Alternatively, other subsystems within the host system 250, such as proxy server 266, may direct communications.

In an embodiment, the computing device 500 transmits the on-line resource identifier to the authentication server 700 based upon an on-line resource address input or selected by the user. In an alternate embodiment, the computing device 500 may transmit the on-line resource identifier to the authentication server 700 based upon the content received from the web server 600. In an alternate embodiment, the computing device 500 may transmit the on-line resource identifier to the authentication server 700 in response to additional user input. The additional user input may comprise an input selection made by the user instructing the device 500 to transmit the on-line resource identifier to the authentication server 700. Alternatively, the additional user input may comprise the authentication credentials entered by the user into the credential input field. The authentication credentials may comprise a credential identifier associated with the authentication server 700 that may be identified by the computing device 500 as being authentication credentials for forwarding to the authentication server 700. In an embodiment, the credential identifier may comprise a pre-defined alphanumeric prefix that may be appended to a random string to comprise the authentication user credential or associated password. The computing device 500 may identify a credential input by a user as being an authentication user credential by matching the specified characters of the input credential with the prefix.

The computing device 500 may transmit the associated authentication user password based upon input from the user, or based upon a stored authentication password associated with the on-line resource and authentication user credential. Preferably, the stored authentication password is maintained in a secure storage on the computing device 500, for instance in encrypted form. While storing passwords in association with an authentication user credential may lead to security weaknesses, the present system and method provides additional safe guards to protect a user.

The computing device 500 may also transmit a computing device identifier or a user identifier to the authentication server 700. Preferably the transmission to the authentication server 700 is encrypted.

The authentication server 700 receives the authentication log-in credentials comprising the authentication user credential, the associated authentication user password and optionally the on-line resource identifier, the computing device identifier or the user identifier, preferably in encrypted form. After decryption, the authentication server 700 compares the received information with information maintained in a user store, such as store 720, accessible to the authentication server 700. The authentication server 700 compares the authentication user credential, the associated authentication user password and the on-line resource identifier to locate the on-line resource user credential and the on-line resource user password stored for the user in association with the identified on-line resource. If a valid match is made as a result of the comparison, the authentication server 700 transmits a decryption certificate, preferably securely, to the computing device 500 for use in association with the on-line resource.

The authentication server 700 also, in one embodiment, transmits, preferably in encrypted form, an authentication comprising on-line resource log-in credentials comprising the on-line resource user credential and the on-line resource user password stored for the user identified by the authentication credentials in association with the identified on-line resource over the wireless network 200 to the mobile computing device 100. The authentication server 700 may also transmit instructions to the mobile computing device 100 associated with the log-in credentials.

The mobile computing device 100 receives and processes the authentication comprising the, preferably encrypted, on-line resource log-in credentials, and optionally the associated instructions. In a preferred embodiment, the instructions include an instruction to authenticate the mobile computing device 100 with the computing device 500 employing short-range communication module 122. The authentication may comprise a standard authentication mechanism known to the person skilled in the art. The short-range communication module 122 is used for the authentication to ensure the computing device 500 is within near proximity to the mobile computing device 100. After authentication, the mobile computing device 100 may transmit, using short-range communication module 122 the encrypted log-in credentials to the authenticated computing device 500.

In an embodiment, the mobile computing device 100 may maintain on-line resource log-in credentials within a secure store on the device 100. In this alternate embodiment, the authentication server 700 may transmit as an authentication, preferably in encrypted form, the on-line resource identifier and encryption security information to the mobile communications device 100. The encryption security information being associated with the decryption security information sent from the authentication server 700 in response to the request. Information encrypted using the encryption security information may be decrypted using the decryption security information. In an embodiment, the on-line resource identifier may comprise a hash of the log-in credentials maintained within the secure store of the device 100.

The mobile communications device 100 may then access the log-in credentials associated with the on-line resource identifier from the secure store, and process the corresponding credentials using the encryption security information supplied by the authentication server 700 to generate a processed authentication comprising encrypted on-line resource log-in credentials. The mobile communications device 100 may then authenticate with the computing device 500 as described above, and transmit the processed authentication, including the encrypted log-in credentials, to the computing device 500.

In an embodiment where the device 100 maintains the log-in credentials in encrypted form, the processing may comprise decrypting the log-in credentials from a first encrypted form and encrypting the decrypted log-in credentials using the encryption security information into a second encrypted form to comprise the processed authentication.

In both embodiments, the authenticated computing device 500 may process the processed authentication received from the mobile communications device 100 to decrypt the encrypted log-in credentials, using the decryption security information sent to the computing device 500 from the authentication server 700, and submit the log-in credentials to the on-line resource in place of the user credential and the associated user password actually entered by the user into the computing device 500.

In such a fashion, a user entering log-in credentials through user input 510 may enter information unrelated to the log-in credentials required by an on-line resource. For instance, a user may enter a single set of log-in credentials for multiple on-line resources, but the computing device 500 will actually authenticate the user with each on-line resource using a unique set of log-in credentials.

Figure 6A:
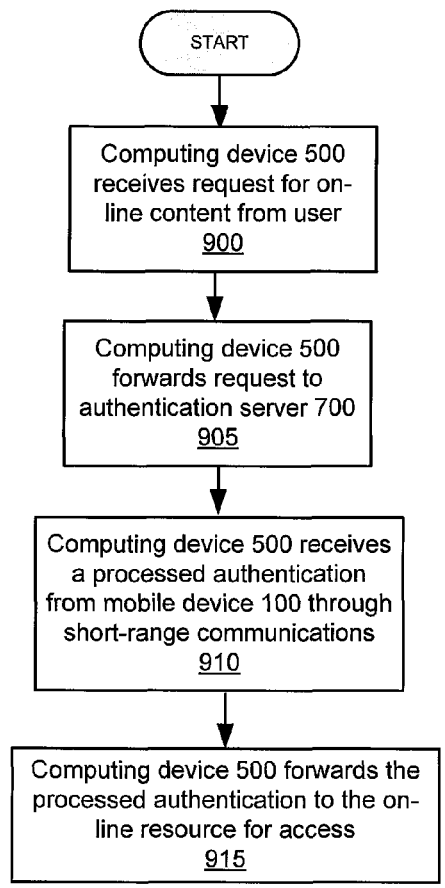
FIG. 6a is a process flow diagram illustrating operations of an embodiment of a computing device.

Referring to FIG. 6*a*, computing device 500 may be operative to receive a request for on-line content from a user in step 900. As indicated above, the user request may comprise the user navigating to an on-line resource available on web server 600 and the web server 600 delivering an authentication portal to the computing device 500. In an embodiment, the request may further comprise the user entering authentication credentials into an authentication portal displayed by the computing device 500. In response to the request, the computing device 500 may forward the request to the authentication server 700 in step 905. As indicated above, the computing device 500 may forward authentication log-in credentials to the authentication server to identify the user. The computing device 500 may receive a processed authentication from a mobile device 100 over short-range communications in step 910. The computing device 500 may forward the processed authentication to the on-line resource for access in step 915.

Figure 6B:
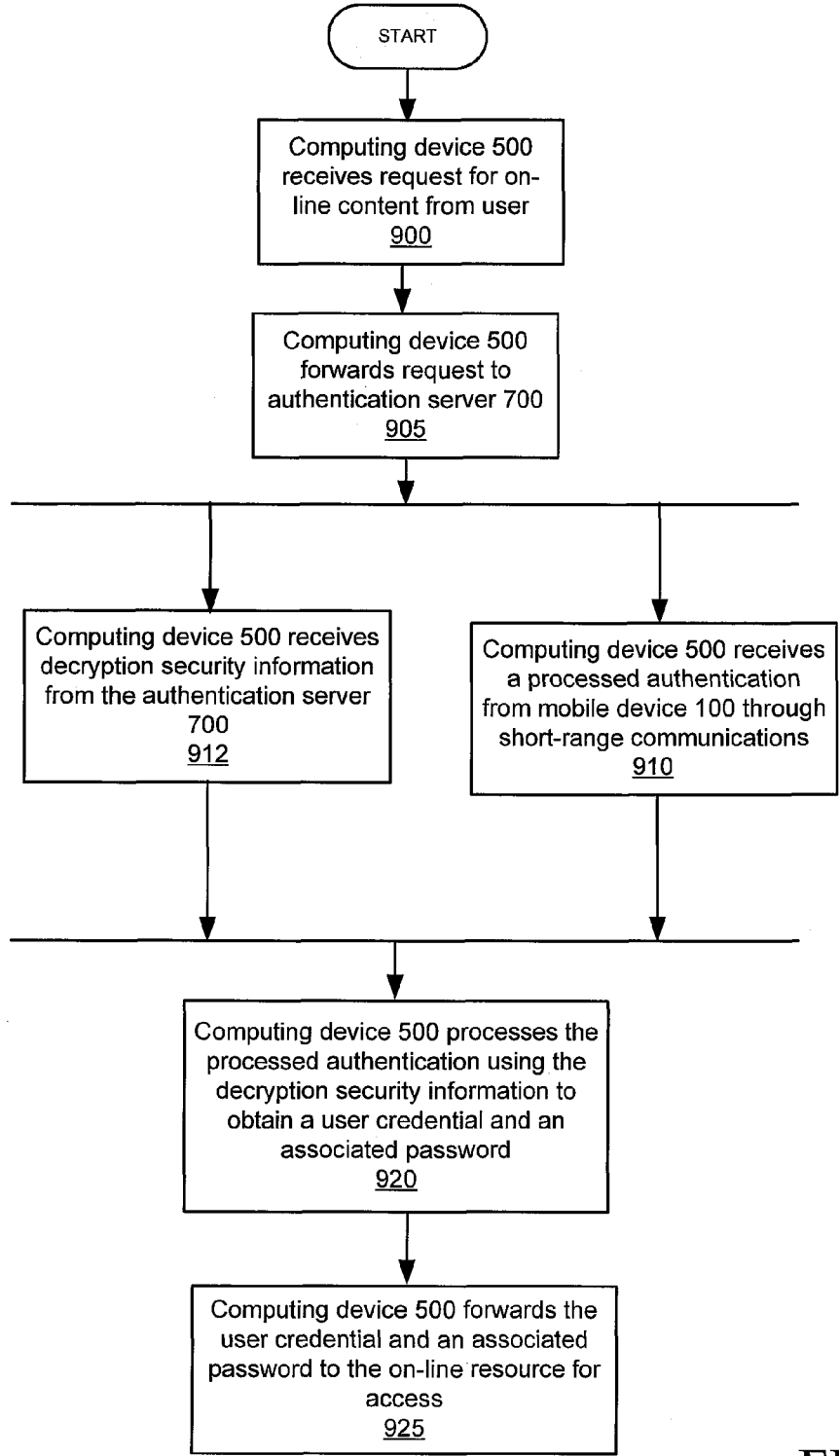
FIG. 6b is a process flow diagram illustrating operations of an embodiment of a computing device.

In an alternate embodiment illustrated in FIG. 6*b*, the computing device may carry out steps 900 and 905 as described above. After forwarding the request to the authentication server 700, however, the computing device 500 may receive both a processed authentication through short range communications in step 910 and decryption security information from the authentication server 700 over the network in step 912. The computing device 500 may use the decryption security information to process the processed authentication to obtain a user credential and an associated password for the on-line resource in step 920. In an aspect, the computing device 500 may process the processed authentication by decrypting the processed authentication using the decryption security information. The computing device 500 may then forward the user credential and the associated password to the on-line resource for access in step 925.

Figure 7:
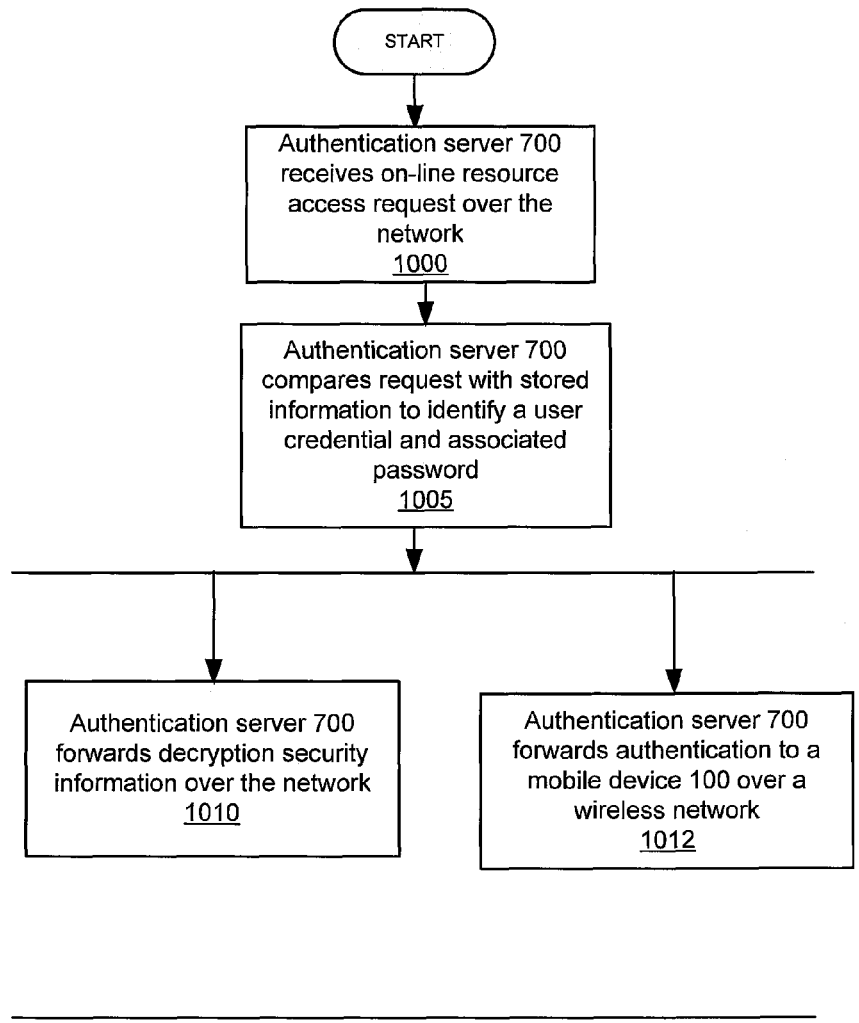
FIG. 7 is a process flow diagram illustrating operations of an embodiment of an authentication server.

Referring to FIG. 7, the authentication server 700 may be operative to receive an on-line resource access request over the network in step 1000. The authentication server 700 may compare the request to stored information to identify a user credential and associated password in step 1005. The authentication server 700 may forward decryption security information over the network in step 1010 and forward an authentication to a mobile device over a wireless network in step 1012.

In an embodiment, the authentication server 700 may forward the decryption security information to the requesting device, for instance computing device 500. In an alternate embodiment, the authentication server 700 may forward the decryption security information to the on-line resource identified in the request, such as web server 600.

As described above, the authentication forwarded in step 1012 may comprise encrypted log-in credentials for the on-line resource, or may comprise an identifier such as a hash to identify log-in credentials stored on a secure store of the mobile device 100.

In an embodiment, after step 1005, but before steps 1010 and 1012, the authentication server 700 may further generate an encryption key and a decryption key, the decryption key comprising the decryption security information forwarded over the network in step 1010. The encryption key may comprise encryption security information included with the authentication forwarded in step 1012 where log-in credentials are stored on the mobile device 100. Alternatively, the encryption key may be used by the authentication server 700 to encrypt log-in credentials resident on the authentication server 700 such that the encrypted log-in credentials comprise the authentication.

Figure 8A:
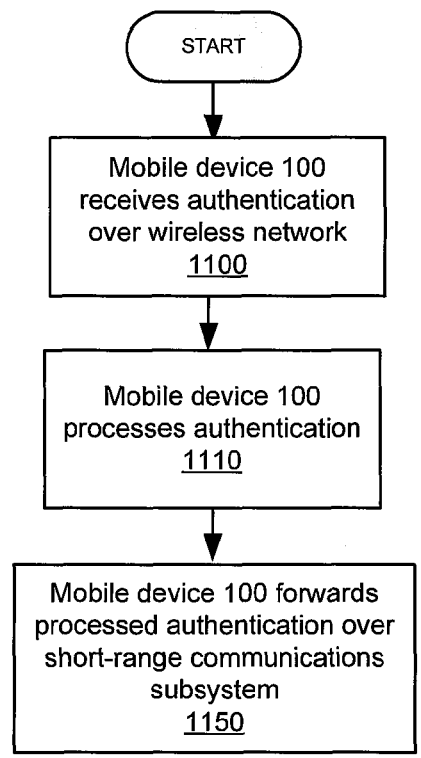
FIG. 8a is a process flow diagram illustrating operations of an embodiment of a wireless mobile device.

Referring to FIG. 8*a*, the mobile device 100 may be operative to receive an authentication over a wireless network in step 1100. The device 100 may process the authentication in step 1110. The mobile device 100 may forward a processed authentication over a short-range communications system, such as Bluetooth™, to a computing device 500 in step 1150.

Figure 8B:
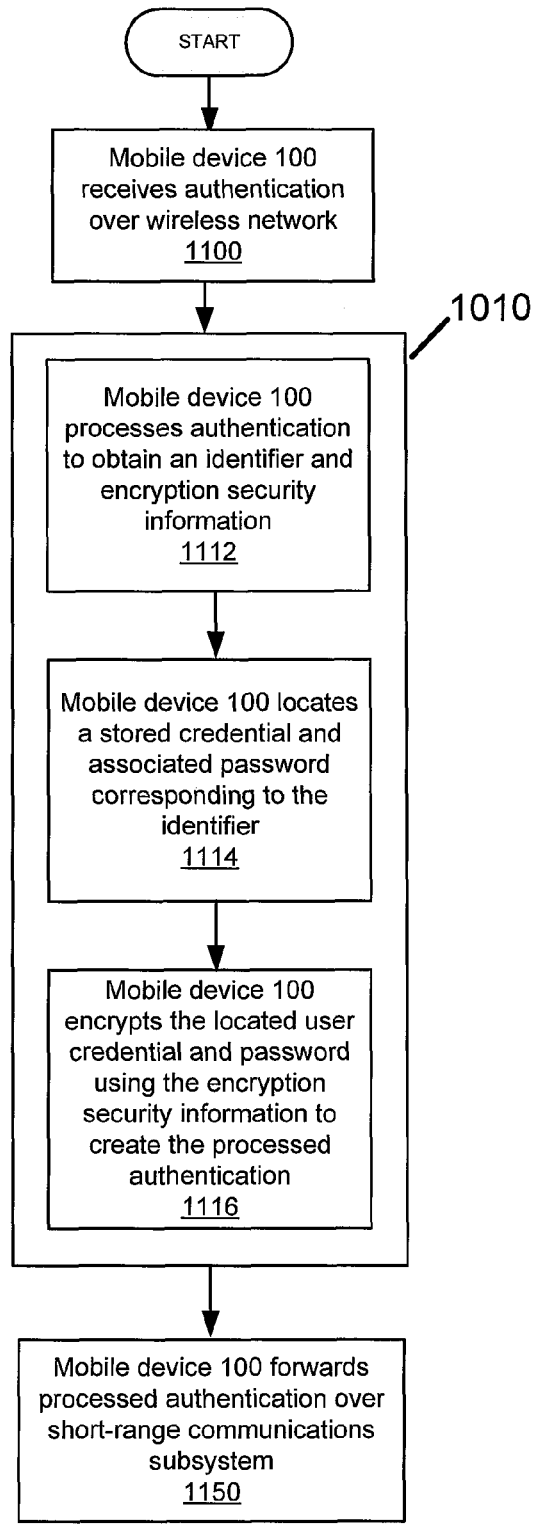
FIG. 8b is a process flow diagram illustrating operations of an embodiment of a wireless mobile device.

Referring to FIG. 8*b*, in an embodiment, the mobile device 100 may store log-in credentials on a secure store of the mobile device 100 and the authentication may comprise an identifier to identify stored log-in credentials that correspond to the current on-line resource request. Accordingly, in the embodiment the authentication processing step 1010 may comprise the mobile device 100 obtaining stored log-in credentials. In the embodiment, the mobile device 100 may process the authentication to obtain the identifier and encryption security information in step 1112. The mobile device 100 may locate stored log-in credentials comprising a stored user credential and associated password that correspond to the identifier in step 1114. The mobile device 100 may encrypt the located log-credentials using the encryption security information to create the processed authentication in step 1116. As above, the mobile device 100 may forward the processed authentication, in this embodiment comprising the encrypted log-in credentials, over the short-range communications subsystem to computing device 500 in step 1150.

Figure 8C:
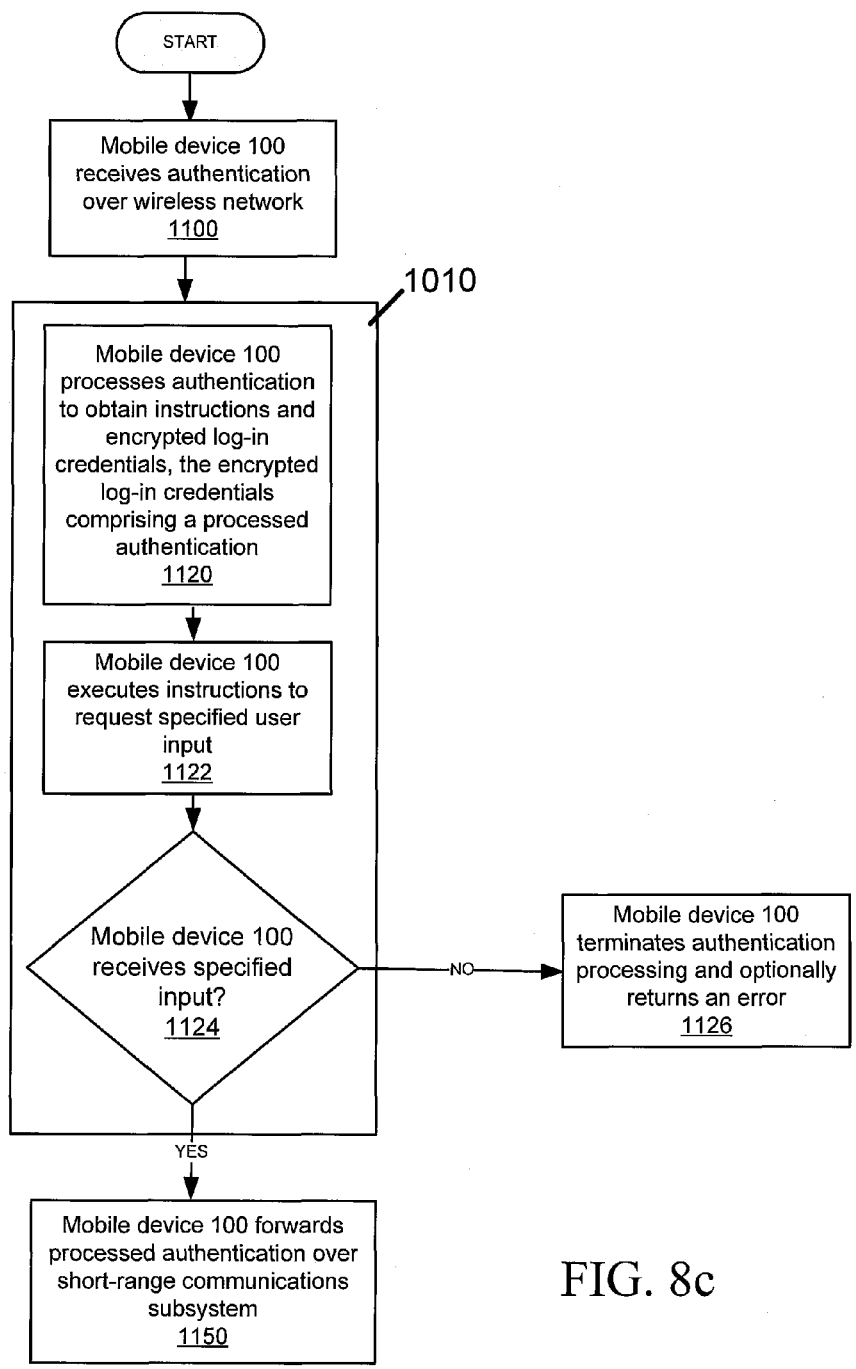
FIG. 8c is a process flow diagram illustrating operations of an embodiment of a wireless mobile device.

Referring to FIG. 8c, in an embodiment, the authentication may comprise instructions for execution by the mobile device 100. Accordingly, in the embodiment, the authentication processing step 1010 may comprise the mobile device 100 processing the authentication to obtain the instructions and execute the instructions. In the embodiment illustrated, the mobile device 100 may process the authentication to obtain instructions and encrypted log-in credentials in step 1120. The encrypted log-in credentials comprising a processed authentication for subsequent forwarding to the computing device 500. Alternatively, the authentication may comprise instructions and an identifier for locating credentials stored on the mobile device 100 as illustrated in FIG. 8b. The mobile device 100 may execute the instructions, for instance to request specified user input in step 1122. The mobile device 100 may determine whether it has received the specified input in a specified form in step 1124. The specified form may comprise temporal limitations or specific input requirements. If the mobile device determines that it has not received the specified input in step 1124, the mobile device 100 may terminate the authentication processing and optionally return an error in step 1126. The error may be returned to either the authentication server 700 over the wireless network or to the computing device 500 over the short-range communications subsystem, or both. If the mobile device 100 determines that it has received the specified input in step 1124, the mobile device 100 may forward the processed authentication, comprising encrypted log-in credentials, over the short-range communications subsystem to the computing device 500 in step 1150.

In an embodiment, the computing device 500 may be operative to automatically open multiple on-line resources in response to the user entering the single set of log-in credentials into an on-line resource from a set of trigger on-line resources as identified in a set of preferences recorded on the computing device 500 for the user.

In an alternate embodiment, the set of preferences may be recorded on the authentication server 700 or the device 100. In response to a master credential being input into the credential field of an on-line resource, the computing device 500 is operative to forward the master credential to the authentication server 700 as described above. Upon receiving the master credential, the authentication server 700 may be operative to identify preferences associated with the master credential and forward instructions to the device 100. The device 100 may receive the instructions from the authentication server 700 and contact the computing device 500 using the short range communications module 122 to spawn the on-line resources specified by the preferences stored on the authentication server 700. Where the preferences are stored on mobile device 100, the device 100 may be operative to identify preferences associated with instructions sent by the authentication server 700 and access log-in credentials stored on the device 100 to forward to the computing device 500. The device 100 may forward at least one set of log-in credentials to the computing device 500 to allow the user to access the spawned on-line resources. In an embodiment, each on-line resource is accessed using a unique set of log-in credentials.

Furthermore, the system may also monitor the user credential and associated user password to ensure that they meet a specified security policy. An exemplar security policy would be a unique user credential and associated user password combination for each on-line resource. An alternate exemplar security policy would be to require a minimum number of characters for each of the user credential and associated user password. In an embodiment a specific variation of characters may be required including capital letters, numbers and symbols, for instance. In an embodiment, the authentication server 700 may assign a random user credential and a random associated user password, each meeting a specified 'strength' of number of letters and type of characters, to each on-line resource.

Log-in credentials for an on-line resource may be entered through a variety of operations. In an embodiment, the computing device 500 may include the operability for a user to set a user credential and associated password for an on-line resource such as web server 600. In the embodiment, the computing device 500 may be operative to present a user with an option to register with an on-line resource. In response to the user selecting the option to register with the on-line resource, the computing device 500 may forward the on-line resource identifier to the authentication server 700 to carry out registration with the on-line resource on behalf of the user. In an aspect, the computing device may collect on-line resource specific authentication log-in credentials from the user.

In an alternate embodiment, the on-line resource may be operative to register the user with the authentication server 700 directly. In the embodiment, a user would navigate to an on-line resource using the computing device 500 and select registration for that resource. In response, the on-line resource would send a registration portal to the computing device 500. The user may enter a user credential, associated password and an authentication server identifier into the registration portal. In an embodiment, the authentication server identifier may comprise a phone number or PIN associated with the mobile device 100. The on-line resource collects the entered information, identifies an associated authentication server from the authentication server identifier and forwards a registration request to the authentication server 700.

In an embodiment, the authentication server 700 may forward a registration notification to a mobile communications device 100 associated with the user requesting registration. The registration notification may require further user input into the mobile device 100. Upon receiving the input, the mobile device 100 may forward a confirmation to the authentication server 700 to proceed with registration.

In a further embodiment, the authentication server 700 may present a registration portal for registering with one or more on-line resources that are operative to interact with the authentication server 700. A user may connect to the registration portal using computing device 500, for instance by navigating to the registration portal using an Internet browser, and register for the on-line resources. The registration process may include the user providing additional personal information or on-line resource specific information. For instance, in registering with a financial institution on-line, the user may supply a financial institution account number, password or PIN to identify the user as a customer of the financial institution. The authentication server 700, in response to the user registering for the on-line resources, may contact the on-line resources to register log-in credentials for the user. Depending upon the requirements of the on-line resource, the authentication server 700 may further supply the personal information provided by the user for that on-line resource.

The authentication server 700 may monitor the status of the credentials and, either require a user to generate a new set of credentials after a prescribed period of time, or automatically generate and authenticate a new set of credentials with the on-line resource without further user intervention. In an embodiment, the authentication server 700 may refresh the log-in credentials based upon a security level of the device 500.

In this way, the authentication server 700 may ensure that a user's on-line credentials meet a minimum strength and variability requirement and update those credentials as specified. Since the user is only required to remember the credentials that will be transmitted to the authentication server 700, there is less risk that a user will write down or record their credentials in an unsecure location. Furthermore, even if a user did write down their credentials in an unsecure location, a third party would need access to the mobile communications device 100 in order to access the on-line resource.

As indicated above, storing the password to be sent to the authentication server 700 on computing device 500 is less of a security risk than storing passwords to the on-line resource as an attacker would still need access to the mobile computing device 100 to receive the log-in credentials for a particular website.

Having described a general embodiment, more specific exemplar embodiments will be described in more detail below.

Mobile computing device 100 may be used to account for latency in the communications by requiring user input to the device 100 within a pre-determined period of time after the device 100 gives the user an indication such as a tone or vibration. In an embodiment, the device 100 may require a level of user input depending upon instructions sent by the authentication server 700. Preferably the level of user input matches a security level of the on-line resource being accessed. Typical user inputs would include a physical input from the user, such as a key stroke, within a pre-set period of time, In an embodiment the computing device 100 may notify a user through vibratory, tone or visual means that it is ready to receive an input. In a preferred arrangement, the notification may vary with the level of user input required by the mobile computing device 100. In an embodiment, the authentication server 700 will instruct the mobile computing device 100 to obtain a pre-determined input from the user, such as a mobile device credential, before authenticating the computing device 500. The authentication server may instruct the mobile device 100 by including instructions with the authentication sent by the authentication server 700 to the mobile device 100 over the wireless network.

In this way, an on-line resource may be further secured by requiring two types of information from a user. On-line resource credentials, typically entered through user input interface 510 of a computing device accessing a network such as the Internet 800 and a mobile device credential which is manually entered into the device 100 by the user. In this way, a security policy of the authentication server 700 may be imposed on the log-in credentials used to access an on-line resource, such as a unique credential and password for each on-line resource, but a user is only required to remember two sets of credentials, the mobile device credential and the authentication credentials. Furthermore, the mobile device credential is resident on and tested by the mobile device 100, reducing the risk of an attacker breaking the security.

In an embodiment of the authentication server 700, a user may be able to trigger a regeneration of on-line resource credentials by accessing the authentication server 700 directly. In an embodiment, the user may access the authentication server 700 from computing device 500 through a web portal that authenticates the user. In a preferred embodiment the authentication server log-in credentials are different from the credentials entered by the user to access other on-line resources.

Preferably, authentication server 700 is operative to receive the trigger to regenerate on-line resource credentials, process the request to generate on-line resource credentials for one or more on-line resources and communicate directly with the on-line resource, such as web server 600, to update the user's credentials with the on-line resource. In this fashion a user may browse to a single location, the authentication server 700, to refresh their on-line credentials.

In an exemplary situation, a user may employ a temporary public computing device 500, such as a computer in a cyber café or other public location, to access various on-line resources. After concluding their computing session, the user can access the authentication server 700 to regenerate their on-line credentials to secure access to any websites they visited from the cyber café. In a first preferred arrangement, the user may access the authentication server 700 through an authentication portal accessible from the public computing device 500.

In an alternate preferred arrangement, mobile computing device 100 is operative to receive a request from the user to regenerate one or more of their on-line credentials and the mobile computing device 100 may process the request to forward a message to the authentication server 700 using the wireless network 200. The authentication server 700, receiving the message from the mobile computing device 100, may process the message to trigger the regeneration of one or more on-line resource credentials.

In situations where a user does not have their mobile computing device 100 with them when attempting to access an on-line resource, an alternate process may be provided. In an exemplary embodiment, authentication server 700 is operative to receive a log-in credential request from a user accessing the Internet 800 from computing device 500. In response to the log-in credential request, the authentication server 700 may, in a first embodiment transmit the log-in credentials to the user for display by the computing device 500. Preferably communications between computing device 500 and authentication server 700 are secured through encryption. The user may then read the credentials from the screen and enter them directly into the authentication portal of the on-line resource.

In a second exemplary embodiment, the computing device 500 may be enabled, for instance by a plug-in for a web browser executable on the computing device 500, to receive the credentials from the authentication server 700 and auto-populate the authentication portal with the credentials. As above, preferably the communications between the computing device 500 and the authentication server 700 are encrypted.

In an aspect, in response to a request for access without mobile device 100, the authentication server 700 may forward additional security questions to the computing device 500 for response by the user. In an aspect, in response to a request for access without mobile device 100, the authentication server 700 may refresh the user credentials and/or passwords of the on-line resource being accessed after the current session has completed.

In an aspect, in response to a request for access without mobile device 100, the authentication server 700 may forward a notification to the mobile device 100 to alert the user that a request for access without the mobile device 100 has been submitted. In an embodiment, the authentication server 700 may further be operative to receive a notification response from the device 100 within a specified time period. If the authentication server 700 receives the notification response from the device 100 within the specified time period, the authentication server 700 denies the request for access.

Where computing device 500 is a public computer, the authentication server 700 may, in an embodiment, prompt the user for a request to trigger the regeneration of the on-line resource log-in credentials after the on-line resource session has concluded. The authentication server 700 may also prompt the user for a request to trigger the regeneration of the authentication server log-in credentials.

In an embodiment, the regenerated authentication server log-in credentials are communicated to the user by transmitting the credentials from the authentication server 700 over the wireless network 200 to the computing device 100 for display to the user.

In the event that computing device 500 is unable to access the on-line resource available from web server 600 with the supplied log-in credentials, the computing device 500 may forward an error message to either mobile device 100 over the short-range communications or to the authentication server 700 over the Internet 800. In this fashion, the computing device 500 may provide feedback when a received log-in credential fails to access the on-line resource.

In an embodiment, the error message may include information about the rejected log-in credentials, such as a hash of the rejected log-in credentials. In the former case, the mobile device 100 may request an updated log-in credential from the authentication server 700 to replace the rejected log-in credential. In the latter case, the authentication server 700 may process the error message to compare the rejected log-in credential with its records to determine if the rejected log-in credential matches a current log-in credential for the on-line resource stored on the authentication server 700. The authentication server 700 may forward the current log-in credential to the computing device 500, optionally using mobile device 100, if the rejected log-in credential does not match the current log-in credential. If the current log-in credential matches the rejected log-in credential, the authentication server 700 may either refresh the log-in credentials with the on-line resource or return a message indicating that an error has occurred to the user, through computing device 500 or mobile device 100.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A mobile communications device comprising:
   a communications subsystem for communicating over a wireless network;
   a short-range communications subsystem for short-range communications;
   a processor, in communication with the communications subsystem and the short-range communications subsystem;
   a secure memory store, in communication with the processor; and,
   wherein the processor is operative to enable the device to:
      receive authentication data through the communications subsystem, the authentication data comprising information to identify on-line resource log-in credentials stored in the secure memory store, and comprising instructions to be executed by the device, the instructions comprising encryption security information;
      process the authentication data and execute the instructions to render the processor further operative to process the information to locate the identified on-line resource log-in credentials and secure the identified on-line resource log-in credentials using the encryption security information to create processed authentication data; and,
      transmit the processed authentication data to a computing device through the short-range communications subsystem.

2. The device of claim 1, wherein the processor is further operative to decrypt the identified on-line resource log-in credentials from a first encryption state when stored in the secure memory store and to encrypt the decrypted identified on-line resource log-in credentials using the encryption security information into a second encrypted state.

3. The device of claim 1, further comprising:
   a user input interface; and,
   the processor operative to execute the instructions to request and require user input through the user input interface, before the device transmits the processed authentication data.

4. The device of claim 3, wherein the user input is to be input through the user input interface within a specified period of time after at least one of a tone or vibration is output.

5. The device of claim 3, further comprising:
   the processor operative to receive the user input through the user input interface, compare the user input with a pre-defined user input stored on the device, and transmit the processed authentication data if the user input matches the pre-defined user input.

6. The device of claim 5, wherein if the user input fails to match the pre-defined user input, the processor is operative to transmit an error message.

7. The device of claim 1, wherein the information to identify the on-line resource log-in credentials stored in the secure memory store comprises a hash of the on-line resource log-in credentials.

8. A method for performing user authentication, through a computing device connected to a network, in response to a request to access an on-line resource hosted on a server accessible via the network, the method comprising:
   the computing device receiving the request for on-line content;
   the computing device transmitting the request to an authentication server connected to the network;
   the computing device receiving decryption security information over the network and receiving processed authentication data over a short-range communications subsystem,
   the computing device processing the processed authentication data using the decryption security information to obtain on-line resource log-in credentials;
   the computing device transmitting the on-line resource log-in credentials to the server over the network to perform the user authentication;
   a mobile communications device receiving from the authentication server over a wireless network authentication data comprising instructions, the instructions comprising an identifier and encryption security information;

the mobile communications device processing the authentication data by executing the instructions to identify on-line resource log-in credentials stored on the mobile communications device and encrypting the identified on-line resource log-in credentials to create the processed authentication data; and the mobile communications device transmitting the processed authentication data over a short-range communications subsystem of the mobile communications device to the computing device.

9. The method of claim 8, further comprising:

the server receiving decryption security information from the authentication server;

the server processing the on-line resource log-in credentials using the decryption security information to perform the user authentication.

10. The method of claim 8, further comprising:

the authentication server receiving the request;

the authentication server comparing the request with stored information to identify on-line resource log-in credentials;

the authentication server transmitting authentication data to a mobile communications device over a wireless network and decryption security information to the computing device over the network for decrypting encrypted on-line resource log-in credentials identified by the request.

11. The method of claim 8, wherein the instructions comprise a requirement to obtain a specified user input and the executing comprise the mobile communications device notifying the user of a specified request for user input and transmitting the processed authentication data to the computing device if the requested input is received.

12. A method for performing user authentication, the method comprising:

a processor of a mobile communications device receiving authentication data through a communications subsystem, the authentication data comprising information to identify on-line resource log-in credentials stored in a secure memory store of the mobile communications device, and comprising instructions to be executed by the mobile communications device, the instructions comprising encryption security information;

the processor processing the authentication data and executing the instructions to render the processor operative to process the information to locate the identified on-line resource log-in credentials and secure the identified on-line resource log-in credentials using the encryption security information to create processed authentication data; and, the processor transmitting the processed authentication data to a computing device through a short-range communications subsystem.

13. The method of claim 12, further comprising the processor of the mobile communications device decrypting the identified on-line resource log-in credentials from a first encryption state when stored in the secure memory store and encrypting the decrypted identified on-line resource log-in credentials using the encryption security information into a second encrypted state.

14. The method of claim 12, further comprising the processor of the mobile communications device executing the instructions to request and require user input through a user input interface of the mobile communications device, before the device transmits the processed authentication data.

15. The method of claim 14, further comprising the processor receiving the user input through the user input interface, comparing the user input with a pre-defined user input stored on the device, and transmitting the processed authentication data if the user input matches the pre-defined user input.

16. The method of claim 14, wherein the user input is to be input through the user input interface within a specified period of time after at least one of a tone or vibration is output.

17. The method of claim 15, further comprising transmitting an error message if the user input fails to match the pre-defined user input.

18. The method of claim 12, wherein the information to identify the on-line resource log-in credentials stored in the secure memory store comprises a hash of the on-line resource log-in credentials.

\* \* \* \* \*